Figure 3:
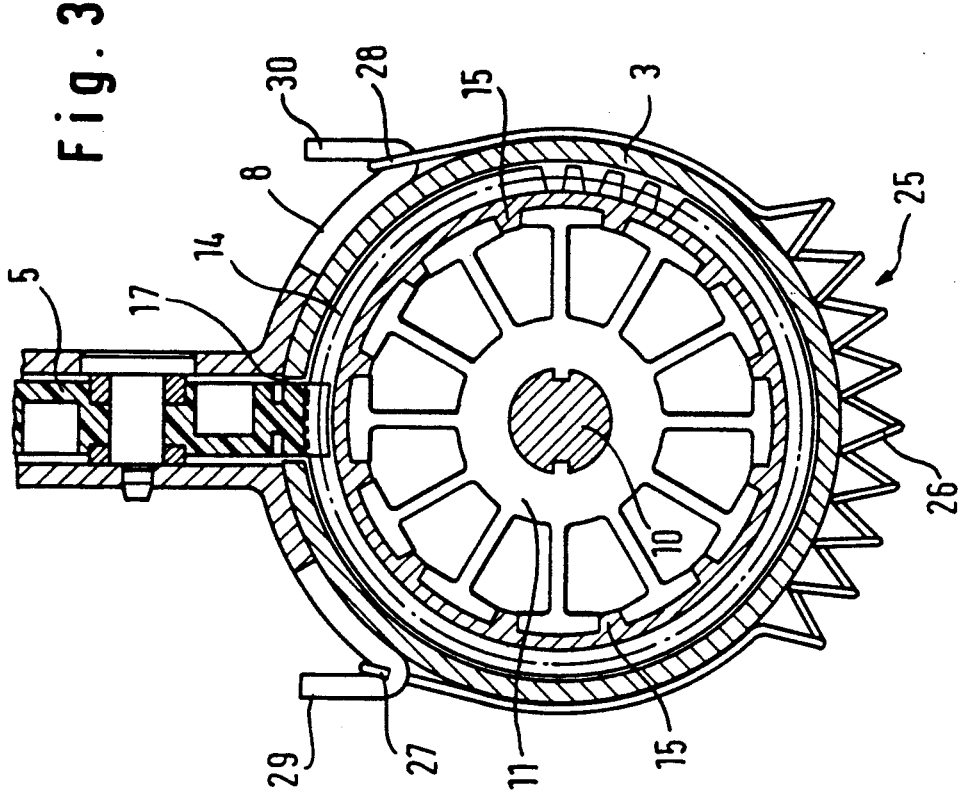

United States Patent [19]

Mösslacher

[11] Patent Number: 5,028,827
[45] Date of Patent: Jul. 2, 1991

[54] DRIVE UNIT COMPRISING AN ELECTRIC MOTOR

[76] Inventor: Hannes Mösslacher, Kravogelstr. 49, 8000 München 60, Fed. Rep. of Germany

[21] Appl. No.: 552,504

[22] Filed: Jul. 16, 1990

[30] Foreign Application Priority Data

Jul. 28, 1989 [DE] Fed. Rep. of Germany ... 8909181[U]

[51] Int. Cl.⁵ .......................... H02K 7/112; E05F 3/16
[52] U.S. Cl. ........................................................ 310/83
[58] Field of Search ...................... 310/83, 89, 90, 80, 310/96, 99; 74/606 R, 7 D, 7 E, 215

[56] References Cited

U.S. PATENT DOCUMENTS

| | | | |
|---|---|---|---|
| 2,639,394 | 7/1951 | Douglas | 310/83 |
| 2,916,642 | 12/1959 | Macks | 310/90 |
| 4,652,781 | 3/1987 | Andrei-Alexandru et al. | 310/83 |

FOREIGN PATENT DOCUMENTS

| | | |
|---|---|---|
| 801869 | 12/1950 | Fed. Rep. of Germany . |
| 8323218 | 10/1984 | Fed. Rep. of Germany . |
| 8713281 | 12/1987 | Fed. Rep. of Germany . |
| 366865 | 10/1906 | France .................................. 310/83 |

Primary Examiner—Steven L. Stephan
Assistant Examiner—Matthew Nguyen
Attorney, Agent, or Firm—Beveridge, DeGrandi & Weilacher

[57] ABSTRACT

A drive unit includes an electric motor and a gear device connected to the electric motor. The electric motor has a stator formed as a pole tube and a rotor arranged therein. The motor output element is formed as a gear member which surrounds the rotor periphery and is connected thereto by friction closure or form closure. The gear device is radially flanged to the cylindrical curved surface of the pole tube.

7 Claims, 2 Drawing Sheets

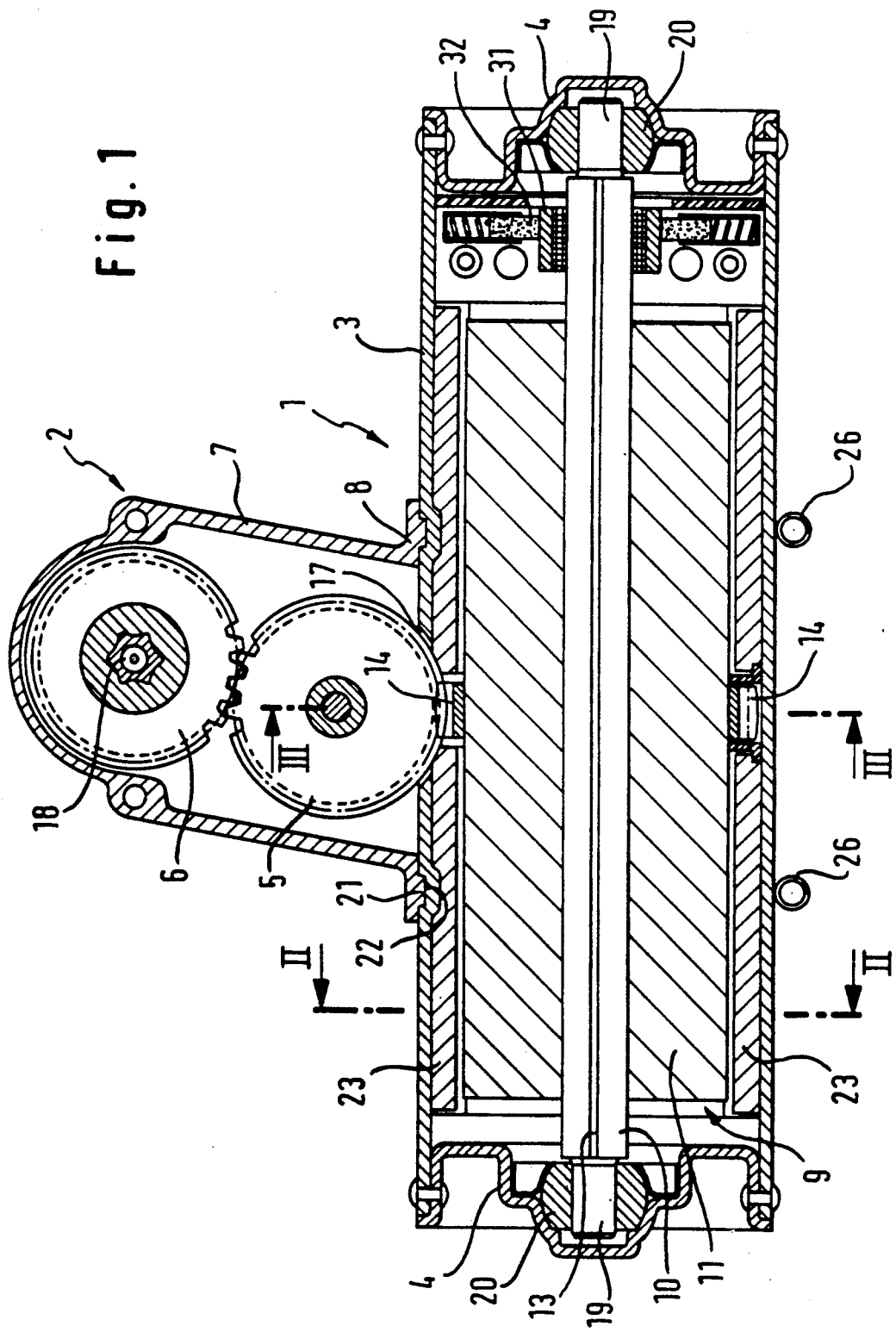

DRIVE UNIT COMPRISING AN ELECTRIC MOTOR

This invention relates to a drive unit comprising an electric motor and a gear connected to the electric motor, wherein the electric motor has a stator formed as a pole tube and a rotor arranged therein.

Drive units comprising an electric motor and a gear flanged thereto find widespread application in the art. Since in most cases the torque of an electric motor is low for a given power while its speed is high, an output transmission gear is necessary.

An usual essentially consists of a rotor and a stator. The stator contains electric coils or permanent magnets affixed to the motor casing as a rule. The rotor usually comprises an armature lamination mounted on a motor shaft, with grooves being arranged in the armature lamination along which the armature windings extend.

Smaller drive units are often used as actuators within bigger machines, motor vehicles or the like, such as for the opening and closing of sliding roofs. In such applications, the motor casing consists of a pole tube comprising permanent magnet poles on its interior side.

In particular in case of actuators, problems of design, mounting and maintenance arise from the small spaces available for the construction. The gear is normally flanged to the pole tube at an end face thereof, with the motor shaft extending from the motor casing into the gear box. The construction of these conventional drive units entails a great longitudinal extension. Beside the great constructional length, there is also the problem of lacking flexibility as regards the choice of the location where the gear can be mounted to the motor. Thus, as an indirect consequence, the place of the output of the gear is also restricted, except for minor differences due to the design of the gear. This results in further handicaps concerning the arrangement of the mechanism to be driven, for example the actuator mechanism or the mechanism for opening and closing a sliding roof.

In many cases, a spur gear is mounted to a motor shaft extending from the motor by means of a suitable driver, such as a feather key; for this purpose, however, narrow tolerance limits have to be kept for the orthogonality between the motor shaft and the flange face. In contrast to a spur gear, a worm gear comprising a worm mounted on the motor shaft, as is also customary in the art, has to be connected to the motor in most cases in such a way that the associated motor cap is an integral part of the gear casing and bears the motor shaft. This necessity results from the very narrow tolerances that have to be kept for the distance between the spur wheel axis and the worm, in addition to the tolerance allowable for the orthogonality. Hence, for a drive unit comprising a worm gear, there is not only the problem of more complicated construction, but also the disadvantage that modular concepts, i.e. the option of combining different gears with like motors and vice versa, are difficult to realize in customary drive units, since the motor and respective gear have to be matched exactly, as the gear constitutes a motor cap including the bearing fixed therein and, thus, forms part of the motor. Moreover, in such drive units the motor bearing has to be detached for exchanging the gear.

The invention achieves the object of providing a pertinent drive unit which assures high flexibility in mounting the gear to the motor while only requiring a small longitudinal extension and simple construction.

This object is achieved by the features that the motor output is formed as a gear member surrounding the rotor periphery and connected thereto by friction or form closure, and the gear is radially flanged to the cylindrical curved surface of the pole tube.

The drive unit according to the invention thus provides multiple advantages over conventional drive units. For example, the gear can be flanged to the motor at any place along the entire length of the motor, with the length of the whole drive unit always remaining unchanged. This yields the possibility of displacing the gear output, and hence the point of connection between the driving unit and the mechanism to be driven, to a desired place, thus enhancing the constructional flexibility of the drive unit.

With the help of the drive unit of the invention, modular concepts are easily possible even for worm gears, since the gear casing does not have to serve at the same time as an integral part of the motor, i.e. as a cap usually defining a bearing of the motor.

If the output drive through the gear member is taken approximately from the middle of the motor length, an additional advantage in the form of a small torsion length of the motor shaft is attained, since in comparison with presently used drive units comprising an output at the end of the motor shaft, only half as much torsion length is required and, thus, the motor shaft of the drive unit according to the invention represents a torsion bar spring of comparatively double stiffness.

In particular when the drive unit is employed as an actuator requiring a high reduction ratio, the gear member preferably consists of a worm mounted on the rotor and having an inner diameter corresponding to the outer diameter of the rotor, with the inner diameter comprising projections in the form of studs or the like which engage the armature grooves and, thus, provide form closure between the worm and the rotor. For other applications, spur wheels or pulleys may be useful embodiments of the gear member.

As a further advantage of the drive unit according to the invention, the pole tube can be formed in a continuous manner and closed at both ends by two respective caps of equal construction. Thus, all parts of the electric motor are enclosed in the pole tube closed at both ends by two respective caps, and the motor shaft does not extend from the motor casing, whereby high categories of protection types, e.g. IP 66, can be easily attained.

In this context, the motor shaft is preferably journalled at both ends by respective calotte bearings mounted in the caps. For the sake of simplicity, the two caps, and thus also the two calotte bearings mounted therein, may be identical. By means of the calotte bearings, angular deviations are compensated for, thus allowing less precise manufacturing tolerances. In contrast to the presently known drive units, the requirement of narrow manufacturing tolerances regarding orthogonality between the motor shaft and a flange face is entirely dispensed with, since the motor shaft does not exit from the motor casing and no gear is mounted as a connection part on the motor shaft.

Preferably, the gear of the drive unit according to the invention comprises a gear flange curved in conformity with the cylindrical curved surface of the pole tube and flanged to the pole tube by means of a quick-mounting apparatus encompassing the circumference of the pole tube. In case of a modular construction system, this quick-mounting apparatus enables different gears to be mounted to the same motor type and vice versa. However, other kinds of mounting are alternatively possible. For instance, a centering edge may be formed on the pole tube, onto which a gear comprising a corresponding bottom opening in its casing may be put. Since as a rule the gear is flat, not only a circular centering edge but alternatively also a rectangular centering edge in combination with a corresponding rectangular opening in the gear casing is recommendable. The gear may then be fixed by means of headless screws screwed into the gear casing and engaging the centering edge, or by forming threaded eyes in the centering edge while providing only through holes in the gear casing. As a further kind of fixing, for instance a larger eye having a rectangular or circular area may be formed on the pole tube, the flange of the gear casing in this arrangement also being flat and suitable for being screwed to said area. In this case, the flange is provided with through holes, while corresponding threaded bores are arranged along the edge of the eye. For simpler and more precise mounting, a centering edge may be additionally formed on the eye of this fixing type, thus not only facilitating the assembly but also achieving form closure between the gear casing and the pole tube for preventing lateral displacement of the gear.

Figure 2:
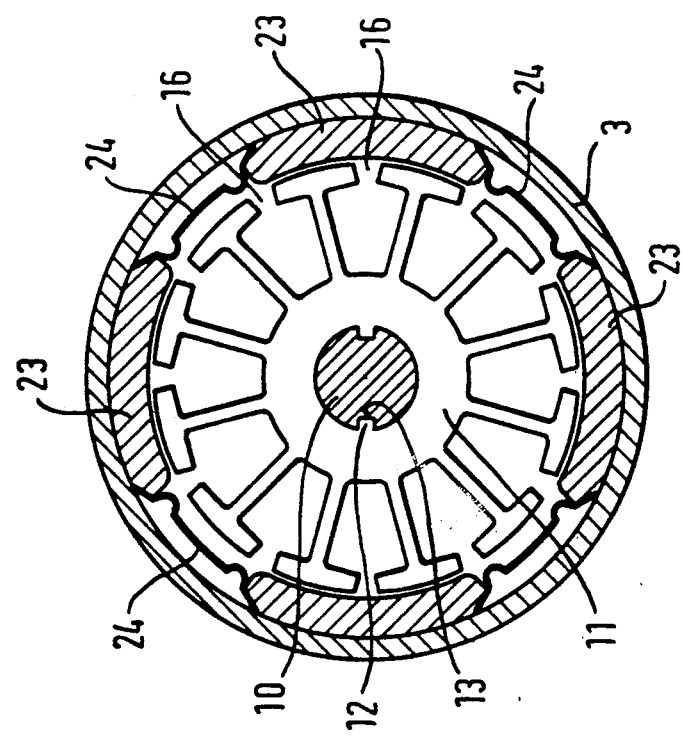

In the following, the invention will be described in greater detail with reference to the drawing wherein there is shown in FIG. 1 a sectional view along the longitudinal axis of a drive unit according to the invention;

FIG. 2 a sectional view along line II—II of FIG. 1; and in

FIG. 3 a sectional view along line III—III of FIG. 1.

The drive unit illustrated in FIG. 1 in the form of a longitudinal section consists of an electric motor 1 and a gear 2. The casing of the electric motor 1 essentially consists of a seamless, drawn, rolled or cast pole tube 3 and equal caps 4 manufactured as pressed pieces closing the front and rear faces of the pole tube 3. Gear wheels 5 and 6 are accommodated in a cast gear casing 7 radially flanged to the electric motor 1 by means of a gear flange 8 conforming to the cylindrical surface of the pole tube 3, as can be seen from FIG. 3. The flange 8 is provided with projections 21 engaging grooves 22 impressed circumferentially in the pole tube 3.

As is apparent from FIG. 3, the flange 8 is firmly pressed onto the cylindrical curved surface of the pole tube 3 by means of a quick-mounting apparatus 25. The quick-mounting apparatus 25 consists of a tension spring 26 whose end portions 27 and 28 are hooked into pegs 29 and 30, respectively, disposed on the rim of flange 8.

The rotor 9 essentially consists of the motor shaft 10 and the packeted armature laminates 11 whose noses 12 positively engage longitudinal grooves 13 of the motor shaft 10. The rotor 9 is journalled by means of equal journals 19 worked out on the lathe at both ends of the motor shaft 10 and put into respective calotte bearings 20 whose exterior circumferences are fixed to the respective caps 4.

A worm 14 is positively connected to the rotor 9 by means of stud-shaped projections 15 extending radially inwardly and engaging armature grooves 16, as can be seen from FIGS. 2 and 3. Through a slot 17 milled in the pole tube 3, the worm 14 meshes with the worm wheel 5 which in turn meshes with the gear wheel 6 whose shaft 18 constitutes the output of the gear 2 and, thus, of the whole drive unit.

The stator of the electric motor is essentially constituted by several permanent magnets 23 held by springs 24 and grooves 22 impressed in the pole tube 3, as can be seen from FIGS. 1 and 2.

Thus, all functional units of the electric motor 1 inclusive of the commutator 31 and the carbon brushes 32 are disposed within the motor casing formed by the pole tube 3 and the caps 4, and the motor shaft 10 does not extend from the motor casing, as the motor output realized by worm 14 is also arranged in the motor casing.

In addition, bearing rings may be provided beside the worm 14 on one or both sides thereof for preventing the worm, and hence the rotor axis, from yielding under heavy load.

I claim:

1. Drive unit comprising an electric motor and a gear means connected thereto,
   the electric motor comprising a rotor and a stator, the stator being formed as a pole tube having two ends and a cylindrically curved outer surface, the rotor being arranged in the pole tube and having a rotor body and a rotor shaft journalled in bearings,
   the gear means comprising a gear casing flanged to the pole tube and a gear member connected to the rotor, the gear member surrounding the periphery of the rotor body between the two ends of the pole tube, and the gear casing being radially flanged to the cylindrically curved surface of the pole tube between the two ends thereof.

2. Drive unit according to claim 1, wherein the gear member is connected to the rotor by a friction closure.

3. Drive unit according to claim 1, wherein the gear member surrounding the rotor is a worm.

4. Drive unit according to claim 2, wherein all parts of the electric motor are disposed in the pole tube which is closed at both of its ends by two caps.

5. Drive unit according to claim 4, wherein the rotor shaft is journalled at both of its ends by calotte bearings mounted in the caps.

6. Drive unit according to claim 4 wherein the two caps, and thus also the two calotte bearings mounted therein, are identical.

7. Drive unit according to claim 1, wherein the gear means comprises a gear flange curved in conformity with the cylindrical curved surface of the pole tube, the gear flange being attachable to the pole tube by means of a quick-mounting apparatus encompassing the circumference of the pole tube.

* * * * *